United States Patent [19]
Frick et al.

[11] Patent Number: 6,003,219
[45] Date of Patent: Dec. 21, 1999

[54] METHOD OF MAKING A PRESSURE TRANSMITTER HAVING PRESSURE SENSOR HAVING COHERED SURFACES

[75] Inventors: Roger L. Frick, Hackensack; Gregory C. Brown, Minnetonka, both of Minn.

[73] Assignee: Rosemount Inc., Eden Prairie, Minn.

[21] Appl. No.: 09/066,790

[22] Filed: Apr. 24, 1998

[51] Int. Cl.⁶ .................................................. H01G 5/02
[52] U.S. Cl. ........................ 29/25.41; 73/718; 73/724; 361/283; 451/41; 451/53
[58] Field of Search ........................... 29/25.41; 451/53, 451/41; 361/283.3, 283.4; 73/718, 724

[56] References Cited

U.S. PATENT DOCUMENTS 3,618,390  11/1971  Frick .......................................... 73/718
5,624,760  4/1997  Collins et al. ........................ 451/41 X

*Primary Examiner*—Carl E. Hall
*Attorney, Agent, or Firm*—Westman, Champlin & Kelly, P.A.

[57] ABSTRACT

A pressure transmitter having a pressure sensor includes a first half cell and a second half cell. The first half cell includes a first recess formed therein filled with brittle material and having a first sensor surface formed thereon. The second half cell is coupled to the first half cell and includes a second recess formed therein which opposes the first recess and is filled with brittle material having a second sensor surface formed thereon. A diaphragm is positioned between the first and second sensor surfaces. The diaphragm deflects in response to applied pressure. The first and second sensor surfaces comprise heated surfaces.

10 Claims, 3 Drawing Sheets

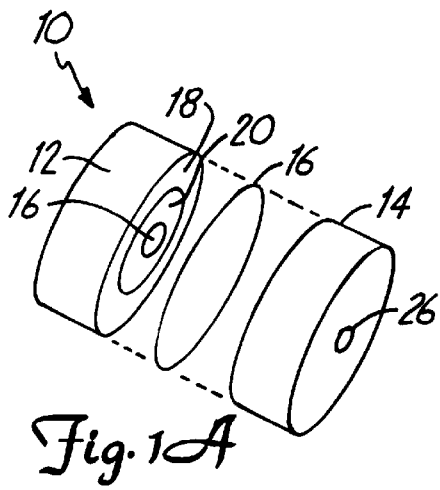
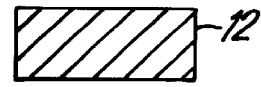
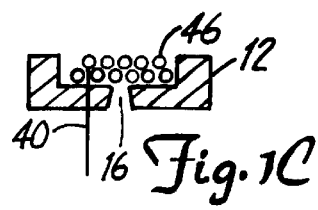
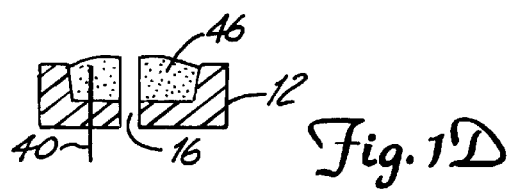
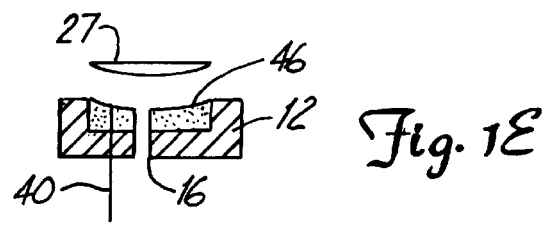
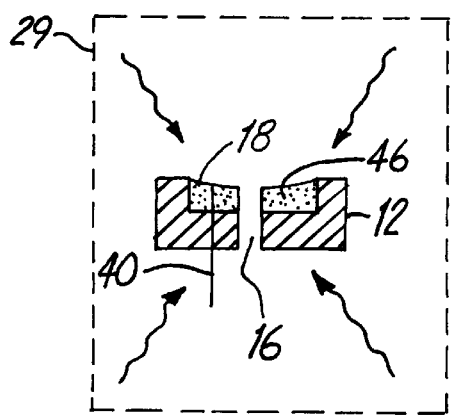

METHOD OF MAKING A PRESSURE TRANSMITTER HAVING PRESSURE SENSOR HAVING COHERED SURFACES

BACKGROUND OF THE INVENTION

The present invention relates to pressure transmitters of the type used in industrial process control systems. More specifically, the present invention relates to a pressure sensor for use in a pressure transmitter.

Pressure transmitters are used in industrial process control systems to monitor pressures of process fluids. A pressure transmitter includes a pressure sensor which is coupled to a process fluid and provides an output in response to pressure applied by the process fluid. Two well known types of pressure transmitters are the Model 3095 and Model 1151 pressure transmitters available from Rosemount Inc. of Eden Prairie, Minn. Pressure transmitters are also shown in U.S. Pat. No. 5,094,109, for example.

Inaccuracies in the pressure sensor limit the ability of the pressure transmitter to accurately measure a pressure. In turn, this limits the accuracy of a control system which relies upon the pressure measurement from the pressure sensor. There is an ongoing desire in pressure transmitters to improve the accuracy and longevity of the pressure sensor.

SUMMARY OF THE INVENTION

The present invention includes a pressure transmitter having a pressure sensor which includes a first half cell and a second half cell. The first half cell includes a first recess formed therein filled with brittle material and having a first sensor surface formed thereon. The second half cell is coupled to the first half cell and includes a second recess formed therein which opposes the first recess and is filled with brittle material having a second sensor surface formed thereon. The first sensor surface and the second sensor surface generally face each other. A diaphragm is positioned between the first and second sensor surfaces and deflects in response to applied pressure. The first and second sensor surfaces comprise heated surfaces which are cohered or otherwise of reduced friability.

A method of making a pressure sensor for use in a pressure transmitter includes obtaining a cell having a recessed formed therein and filling the cell with a solidified brittle material. The method includes machining a sensor surface on the brittle material, the machined sensor surface being friable. The pressure sensor is then formed from the cell filled with the brittle material. The step of forming a pressure sensor includes heating the machined sensor surface to cause a reduction in friability of the surface.

BRIEF DESCRIPTION OF THE DRAWINGS

FIG. 1A is an exploded perspective view of a pressure sensor in accordance with the present invention.

FIGS. 1B, 1C, 1D, 1E and 1F are side cross-sectional views of a half cell of a pressure sensor which illustrate a method in accordance with the present invention.

DETAILED DESCRIPTION OF THE PREFERRED EMBODIMENTS

Figure 2:
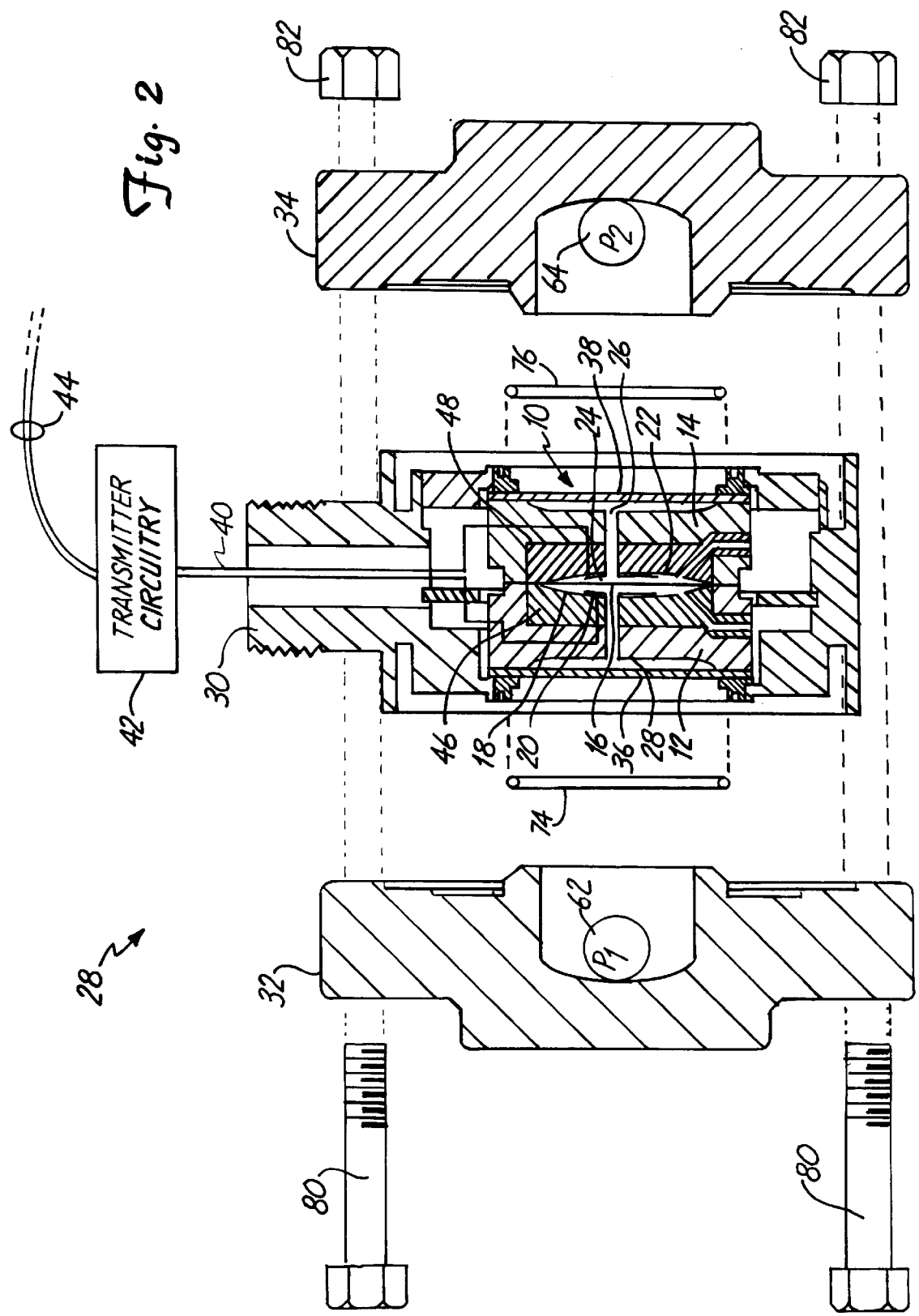
FIG. 2 is an exploded cross-sectional view of the pressure sensor of FIG. 1A in a pressure transmitter.

The present invention relates to a pressure sensor of the type used in a pressure transmitter which has an internal sensor surface formed of a brittle material. The sensor surface has been ground, polished or otherwise abraded during manufacture. It has been discovered that such machining of the sensor surface causes the surface to have a friable or crazed surface which can shed particles after the sensor has been assembled. These particles interfere with sensor operation and cause non-linearity in the output of the pressure sensor thereby leading to inaccuracies, and shorten the lifespan of the sensor. Additionally, these particles may puncture diaphragm during overpressure and cause failure of the electrical contact. In the present invention, the sensor surface is heated to cause the brittle material to cohere. Preferably, the heating is not sufficiently high to cause significant deformation in the sensor surface. The sensor surface is allowed to slowly cool and cracks at the surface tend to fill during the heating process. Further, this reduces the friability of the surface and any loose particles become more resistant to separation from the sensor surface, thus reducing the problem with non-linearities.

FIG. 1A is a simplified exploded perspective view of a pressure sensor 10 in accordance with the present invention. Sensor 10 includes first half cell 12 coupled to second half cell 14 with diaphragm 16 suspended therebetween. Half cell 12 includes sensor surface 18 formed therein which carries electrode 20. Half cell 14 includes sensor surface 22 formed therein which carries electrode 24 (not shown in FIG. 1A). A pressure connection 26 extends through half cell 14 and a similar pressure connection 28 (not shown in FIG. 1A) extends through half cell 12. In accordance with the present invention, sensor surfaces 18 and 22 are heated to cause coherence of any loose particles.

Pressure sensor 10 is fabricated in accordance with the present invention. FIG. 1B is a side cross-sectional view of first half cell 12 prior to addition of brittle material 46. FIG. 1C is a side cross-sectional of first half cell 12 in which a recess has been formed therein and filled with beads of brittle material 46. Pressure connection 16 has also been formed in half cell 12. For example, a ceramic cylinder with holes may be "glassed" in to provide passageways. Electrical conductor 40 is fed through half cell 12 into brittle material 46. The half cell is then heated such that brittle material 46 melts to conform to the recess as shown in the cross-sectional view of FIG. 1D. The brittle material 46 is machined using, for example, a grinder 27 to form a slight recess as shown in the cross-sectional view of FIG. 1E. In accordance with the present invention, half cell 12 is then placed in, for example, an oven 29 such that half cell 12 is heated. This heating causes any loose materials created to cohere. An electrode 20 may then be deposited on sensor surface 18 in electrical contact with conductor 40. In one preferred embodiment, the brittle material comprises glass. Two such half cells, 12,14 are then welded with thin metallic diaphragm 16 stretched therebetween.

One aspect of the present invention includes the recognition that the process of machining the brittle material causes sensor surfaces 18 and 20 to be crazed surfaces which can shed particles, particularly during the welding process. The particles can interfere with operation of sensor 10 and, in particular, movement of diaphragm 16. This reduces the accuracy and life time of the pressure measurements.

In accordance with the present invention, pressures sensor 10 (and in particular brittle material 46,48) is heated to a sufficiently high temperature for a sufficient duration to cause any loose or partially loose material or particles on surfaces 18,22 to cohere or otherwise bond to the surface such that they will not be dislodged during subsequent operation. For example, if brittle material 46,48 comprises glass, a temperature of between about 500° C. and 550° C. is sufficient to cause this cohesion. In one preferred embodiment, the glass comprises S-8080, melt No. OB2492, part No. 0 3031-0418-0001 having an Index of Refraction of 1.62520-1.62604, a CTE of 115, a Density of 3.51, a Strain Point (°C.) of 373, a Annealing Point (°C.) of 395, a Softening Point (°C.) of 535, a Working Point (°C.) of 785, a Dielectric Constant of 7.9, a Young's Modulus of 58 and Possion's Ratio of 0.024. In one preferred embodiment, the Straining Point is between about 500° and 550° C. Further, the time of such heating should be sufficiently long to allow the cohesion to occur. For example, between about 10 and about 15 minutes. If the heating is sufficiently high for a sufficiently long period, the sensor surface 18,22 will change from an opaque or cloudy appearance to a substantially transparent (translucent) or clear appearance. The resultant sensor surfaces 18,22 are characterized in that they contain cohered (or recohered) particles. The temperature and heating period, however, are preferably not sufficient to allow brittle material 46,48 and surfaces 18,22 to significantly distort due to melting which could lead to inaccuracies in pressure measurements. In one preferred embodiment, the heat treatment is performed in a nitrogen filled atmosphere to prevent oxidation of the components. Additionally, the heat treatment may be applied prior or subsequent to coupling the two cell halves 12,14 together.

In addition to cohering the loose particles, the heat treatment in accordance with the present invention smoothes sensor surfaces 18 and 22 such that electrodes 20 and 24 deposited on surfaces 18,22 are substantially smooth. This reduces the resistivity of the metal in electrodes 20,24 thereby providing improved accuracy. Additionally, the heat treatment may be used to reduce the electrical resistance of the connection between electrical conductors 40 and electrodes 20 and 24. The heat treatment also fills cracks in surfaces 18,22.

FIG. 2 is an exploded cross-sectional view of pressure sensor 10 in housing 30 of pressure transmitter 28 positioned between flanges 32 and 34. Flanges 32 and 34 are coupled to housing 30 by bolts 80 secured by nuts 82 and sealed by O-rings 74 and 76, respectively. Pressure $P_1$ is applied through port 62 in flange 32 to isolation diaphragm 36. Similarly, pressure $P_2$ is applied through port 64 in flange 34 to isolation diaphragm 38.

In operation, pressures $P_1$ and $P_2$ press against respective isolation diaphragms 36 and 38 thereby pressing on a substantially incompressible fill fluid which fills the cavity between center diaphragm and isolation diaphragms 36 and 38. This causes center diaphragm 16 to deflect resulting in a change in capacitance between diaphragm 16 and electrode 20 and diaphragm 16 and electrode 24. Electrical conductors 40 couple transmitter circuitry 42 to electrodes 20 and 24. Transmitter circuitry 42 provides an output related to pressures $P_1$ and $P_2$ as a function of capacitance between electrodes 20,24 and center diaphragm 16 over, for example, a two wire process control loop 44. Such process control loops are known in the process control industry and may comprise, for example, a 4–20 mA current loop.

Figure 3:
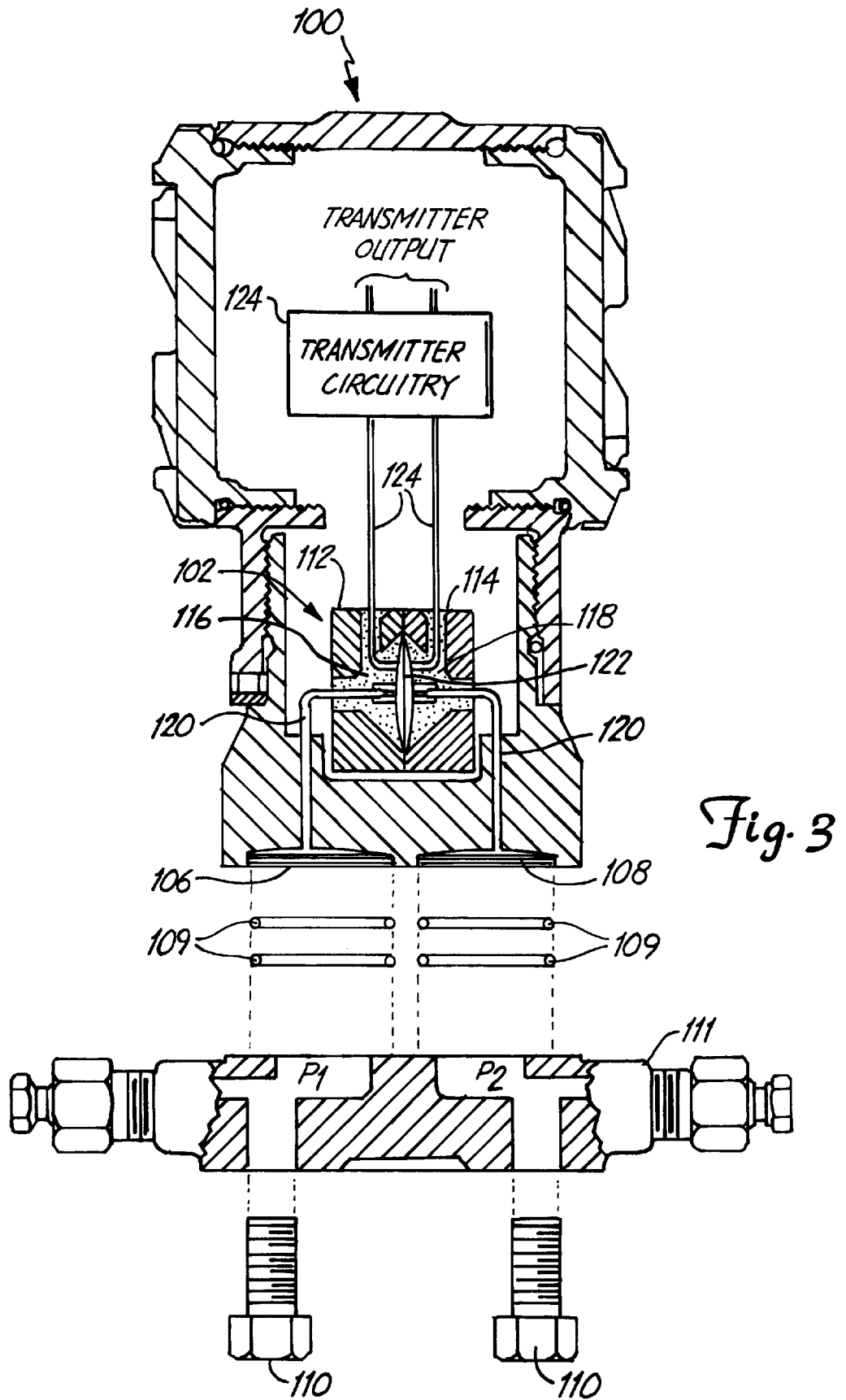
FIG. 3 is an exploded cross-sectional view of a pressure transmitter including a pressure transmitter in accordance with the present invention.

FIG. 3 is a cross-sectional view of a transmitter 100 including a pressure sensor 102 in accordance with another embodiment of the present invention. Transmitter 100 is known in the industry as having a coplanar design because isolation diaphragms 106 and 108 are aligned generally coplanar. Flange 111 couples to transmitter 100 through bolts 110 to thereby couple pressure $P_1$ and $P_2$ to isolation diaphragms 106 and 108. Gaskets 109 provide a seal between flange 111 and isolation diaphragm 106,108. A substantially incompressible fluid is carried in capillaries 120 which couple to pressure sensor 102. Similar to pressure sensor 10, sensor 102 is formed from two half cells 112,114 filled, respectively, with brittle material 116,118. Electrical conductors 124 couple to capacitor plates (not shown) carried on sensor surfaces of brittle materials 116,118. Diaphragm 122 deflects in response to applied pressures $P_1$ and $P_2$ causing a capacitive change which is detected by transmitter circuitry 122 which provides an output related to pressures $P_1$ and $P_2$ over a two wire process control loop.

A pressure sensor in accordance with the present invention is particularly advantageous for use with pressure transmitters of the type used in the process control industry. Such industrial control pressure transmitters typically must isolate the pressure sensor from the process medium. This requires the use of the isolation fluid which fills the space between the sensor diaphragm and the isolation diaphragm. This isolation causes any loose particles to be sealed within the pressure sensor, such that they may build up over time. Further, the sensor may be subjected to environmental extremes such as temperature fluctuations and vibrations. These extremes exasterbate the problems associated with a friable surface. Simply applying a coating, such as an organic coating, to the sensor surface will not be useful for reduction in the friability of the surface because such a coating may break down when exposed to temperature extremes or the fill oil.

Although the present invention has been described with reference to preferred embodiments, workers skilled in the art will recognize that changes may be made in form and detail without departing from the spirit and scope of the invention. Other types of brittle materials such as ceramics may be used in the present invention. Further, steps in accordance with the method of the present invention may be performed in any order as desired and is not limited to the particular order set forth herein. It will also be apparent to those skilled in the art that a pressure sensor cell in accordance with the present invention may have alternative designs and be used with other types of pressure transmitters.

What is claimed is:

1. A method of making a pressure transmitter having a pressure sensor, comprising:

obtaining a cell having a recess formed therein;

filling the recess with a solidified brittle material;

shaping through an abrasion process a friable sensor surface on the brittle material;

assembling a pressure sensor which includes the cell filled with the brittle material;

heating the friable sensor surface during the assembling to cause a reduction in the friability of the surface wherein the heating is performed subsequent to the step of shaping through an abrasion process; and manufacturing the pressure transmitter which includes the pressure sensor.

2. The method of claim 1 wherein the assembling further includes depositing a sensor plate on the sensor surface.

3. The method of claim 2 wherein the heating is performed prior to the step of depositing.

4. The method of claim 2 wherein the heating is performed subsequent to the step of depositing.

5. The method of claim 1 including providing an electrical conductor which extends through solidified brittle material prior to the assembling.

6. The method of claim 5 wherein the including depositing a capacitor plate onto the sensor surface which electrically contacts the electrical conductor.

7. The method of claim 1 wherein the heating comprises placing the cell in an oven.

8. The method of claim 1 wherein the heating is performed by illuminating the sensor surface with a laser.

9. The method of claim 1 wherein the heating is to a temperature less than a softening temperature of the brittle material.

10. The method of claim 1 wherein the heating does not cause a substantial deformation in shape of the brittle material.

* * * * *